(12) United States Patent
Valente

(10) Patent No.: US 9,418,313 B2
(45) Date of Patent: Aug. 16, 2016

(54) METHOD FOR SEARCHING FOR A SIMILAR IMAGE IN AN IMAGE DATABASE BASED ON A REFERENCE IMAGE

(71) Applicant: STMicroelectronics SA, Montrouge (FR)

(72) Inventor: Stéphane Valente, Paris (FR)

(73) Assignee: STMicroelectronics SA, Montrouge (FR)

( * ) Notice: Subject to any disclaimer, the term of this patent is extended or adjusted under 35 U.S.C. 154(b) by 62 days.

(21) Appl. No.: 14/452,761

(22) Filed: Aug. 6, 2014

(65) Prior Publication Data

US 2015/0043828 A1 Feb. 12, 2015

(30) Foreign Application Priority Data

Aug. 8, 2013 (FR) ...................................... 13 57904

(51) Int. Cl.
*G06K 9/62* (2006.01)
*G06K 9/46* (2006.01)

(52) U.S. Cl.
CPC ............... *G06K 9/6202* (2013.01); *G06K 9/46* (2013.01); *G06K 9/4671* (2013.01); *G06K 2009/4666* (2013.01); *G06K 2009/6213* (2013.01)

(58) Field of Classification Search
None
See application file for complete search history.

(56) References Cited

U.S. PATENT DOCUMENTS

| 6,711,293 | B1 | 3/2004 | Lowe | |
|---|---|---|---|---|
| 2002/0178135 | A1* | 11/2002 | Tanaka | G06F 17/30247 |
| 2008/0247675 | A1* | 10/2008 | Magai | G06F 17/30247 |
| | | | | 382/305 |
| 2009/0238460 | A1 | 9/2009 | Funayama et al. | |
| 2012/0011142 | A1 | 1/2012 | Baheti et al. | |
| 2014/0328543 | A1* | 11/2014 | Iwamoto | G06K 9/4604 |
| | | | | 382/201 |

OTHER PUBLICATIONS

Alahi et al., "FREAK: Fast Retina Keypoint," 2012 IEEE Conference on Computer Vision and Pattern Recognition (CVPR), Providence, RI, Jun. 16-21, 2012, 8 pages.
Baheti et al., "Information-Theoretic Database Building and Querying for Mobile Augmented Reality Applications," IEEE International Symposium on Mixed and Augmented Reality, Science and Technology Proceedings, Basel, Switzerland, Oct. 26-29, 2011, pp. 47-53.
Bay et al., "SURF: Speeded Up Robust Features," *Computer Vision and Image Understanding* 110(3):346-359, Jun. 2008.
Calonder et al., "BRIEF: Binary Robust Independent Elementary Features," *Computer Vision—ECCV* 2010 6314:778-792, 2010.
Francini et al., "CDVS: interest point detection, a concise text to help further editing," Telecom Italia, International Organisation for Standardisation, Coding of Moving Pictures and Audio, Geneva, Switzerland, Oct. 2013, M31615, 8 pages.

(Continued)

*Primary Examiner* — David F Dunphy
(74) *Attorney, Agent, or Firm* — Seed IP Law Group PLLC

(57) ABSTRACT

A method for extracting characteristic points from an image, includes extracting characteristic points from a first image, generating for each characteristic point a descriptor with several components describing an image region around the characteristic point, and comparing two by two the descriptors of the first image, the characteristic points whose descriptors have a proximity between them greater than an ambiguity threshold, being considered ambiguous.

23 Claims, 5 Drawing Sheets

(56) References Cited

OTHER PUBLICATIONS

Francini et al., "CDVS: Telecom Italia's response to CE1—interest point detection," Telecom Italia, International Organisation for Standardisation, Coding of Moving Pictures and Audio, Geneva, Switzerland, Oct. 2013, M31369, 26 pages.

Jamshy et al., "Reducing Keypoint Database Size," Image Analysis and Processing, ICIAP 2009, LNCS 5716, pp. 113-122, 2009.

Leutenegger et al., "BRISK: Binary Robust Invariant Scalable Keypoints," IEEE International Conference on Computer Vision (ICCV), Barcelona, Nov. 6-13, 2011, 8 pages.

Lowe, "Distinctive Image Features from Scale-Invariant Keypoints," *International Journal of Computer Vision* 60(2):91-110, Nov. 2004.

Rosten et al., "Machine learning for high-speed corner detection," *Computer Vision—ECCV* 2006 3951:430-443, 2006.

Rublee et al., "ORB: an efficient alternative to SIFT or SURF," IEEE International Conference on Computer Vision (ICCV), Barcelona, Nov. 6-13, 2011, 8 pages.

Shi et al., "Feature selection for reliable data association in visual SLAM," *Machine Vision and Applications*, 2012, 16 pages.

* cited by examiner

METHOD FOR SEARCHING FOR A SIMILAR IMAGE IN AN IMAGE DATABASE BASED ON A REFERENCE IMAGE

BACKGROUND

1. Technical Field

The present disclosure relates to searching in an image database for an object visually similar to an object in a given reference image.

2. Description of the Related Art

Significant developments have recently been made in the field of visual search in particular so that such a search can overcome differences in position in the image, and differences of scale and direction in space, and then be performed using relatively limited computing means, such as those provided in smartphones. The SIFT (Scale-Invariant Feature Transform) and SURF (Speed-Up Robust Features) algorithms have particularly brought major developments in this field. To find identical or similar objects in different images, these algorithms suggest applying a processing operation to each image to be compared, e.g., to the reference image and to each image in the image database. This processing aims to detect characteristic points in the image, then to determine for each characteristic point, a descriptor describing the region around the characteristic point. The search for characteristic points is based on the detection in the image at different scales of locally extreme contrast points, e.g., bright points in the dark areas and dark points in the bright areas.

A characteristic point descriptor is in the form of a vector gathering spatial information relating to a region of the image around the characteristic point. Such a descriptor can be considered a visual signature of the region around the corresponding characteristic point. The position in the image of each characteristic point and its descriptor are stored in the image database in association with each image.

The actual visual search comprises a comparison of each descriptor of the reference image with all or part of the descriptors of each image in the image database. As the descriptors are vectors in the mathematical sense of the word, this comparison may comprise a calculation of a vector difference scalar product or norm. When two descriptors are considered sufficiently close or similar according to certain criteria, the corresponding characteristic points can be considered similar. A geometrical verification is then performed to eliminate points that have been considered similar but do not correspond to a same object appearing on the two images. This verification comprises a step of determining whether a constellation formed by a sub-set of similar points, extracted from one of the two images to be compared, appears in the other image, seen from a different angle, and/or at a different scale, and/or in a different spatial configuration. The characteristic points having no match, given a certain tolerance, in the two images to be compared using this affine transformation are eliminated.

The RANSAC (RANdom SAmple Consensus) algorithm can be used for this purpose to determine in a few iterations an affine transformation model, capable of linking two constellations of characteristic points in the two images to be compared. This algorithm comprises a step of selecting a group of a certain number of characteristic points sufficiently close (similar) in the two images. The chosen number of points can be a minimum number required to determine an affine transformation model. This algorithm further comprises a step of determining the parameters of the transformation model from these points, and of searching among the other similar characteristic points for those corresponding to the transformation model considering a certain tolerance. These steps are executed with other different groups of characteristic points, a certain number of times or until a sufficient number of points is found. The model corresponding to the greatest number of similar characteristic points is considered the best model and all the similar characteristic points that do not correspond to the model are rejected. A final match rating between the two compared images is then calculated. This rating can correspond either to the number of similar characteristic points corresponding to the transformation model thus determined, or to the surface area of the portion of image surrounding all the similar characteristic points corresponding to the transformation model. This surface area corresponds to the surface area of an object represented in the two compared images.

Each image in the image database can thus be associated with a match rating of the match with the reference image. The images having the best rating can thus be supplied in response to a visual search request comprising the reference image.

BRIEF SUMMARY

It transpires that the detection of characteristic points in an image, performed by the known algorithms often supplies a very high number of characteristic points, which renders the geometrical verification process when comparing two images quite substantially complex. It further transpires that repetitive patterns are frequently found in many images, such as the tiles of a roof, the windows of a building, or the tiles of a tiled floor. If each of the repetitive patterns encountered in an image gives rise to the detection of one or more characteristic points, the image will be associated with a significant number of characteristic points. Now, the greater the number of characteristic points of two images to be compared, the greater the number of calculations required for the search for sufficiently close descriptors, and the greater the number of points considered similar, including those wrongly detected as similar. In addition, the greater the number of points detected as similar, the greater the number of affine transformation models to be tested.

Applying a double-rating system to eliminate ambiguous similar points has been proposed. For this purpose, when a characteristic point of the reference image is compared with those of another image, a comparison rating is determined upon each comparison. A compared point is selected as similar if its best comparison rating is significantly higher than its second best rating, for example several times higher than the second rating. It transpires that this solution does not always enable a sufficient number of ambiguous points to be rejected. Furthermore, the comparison of ambiguous points wastes resources both in terms of calculation time, transmission and storage.

In an embodiment, a method comprises: extracting characteristic points from a first image; generating for each characteristic point of the first image a plurality of components of a descriptor describing an image region around the characteristic point; comparing the descriptors of the characteristic points of the first image; and classifying characteristic points of the first image based on the comparing and an ambiguity threshold. In an embodiment, the method comprises: removing characteristic points classified as ambiguous from a set of characteristic points associated with the first image. In an embodiment, the method comprises: associating a first characteristic point of the first image with an ambiguity rating based on a proximity of the descriptor of the first characteristic point to a descriptor of another characteristic point of the first image considered to be a closest characteristic point to the first characteristic point. In an embodiment, the method comprises, for each characteristic point: determining a direction of the characteristic point; determining points of a region around the characteristic point, oriented according to the direction of the characteristic point, from pixels of the region around the characteristic point; dividing the region into sub-regions; and determining for each sub-region a characteristic point descriptor component from the points of the sub-region. In an embodiment, the method comprises: comparing descriptors of characteristic points of the first image with descriptors of characteristic points of a second image, to obtain a set of pairs of characteristic points belonging respectively to the first and second images, the descriptors of which have a proximity lower than a first threshold; defining a set of spatial transformation models linking the respective positions of the characteristic points of at least two pairs; testing the spatial transformation models by determining whether a model links respective positions of the characteristic points of other pairs of characteristic points, within an error margin lower than a position error threshold; and identifying the second image as a relevant visual search image based on whether at least one of the transformation models links characteristic points of a number of pairs greater than a threshold of number of pairs. In an embodiment, the comparing descriptors of characteristic points of the first image to descriptors of characteristic points of the second image is limited to characteristic points classified as non-ambiguous with respect to at least one of the first and second images. In an embodiment, the testing considers ambiguous characteristic points. In an embodiment, the second image is one of a plurality of images of an image database and the method comprises: comparing the first image with a plurality of images of the image database; and associating a visual search relevance rating with images of the image database identified as relevant based on a number of pairs linked by the at least one transformation model. In an embodiment, the second image is one of a plurality of images of an image database and the method comprises: comparing the first image with a plurality of images of the image database; and associating a visual search relevance rating with an image of the image database identified as relevant based on a surface area of a region of the image of the image database delimited by the characteristic points belonging to the pairs linked by the at least one transformation model. In an embodiment, the relevance rating is completed for each image of the image database identified as relevant, ambiguous characteristic points in the first and second images are searched for pairs of characteristic points having a proximity of descriptors lower than the first threshold, and the relevance rating is incremented when the at least one transformation model links respective positions of the characteristic points of a pair of ambiguous characteristic points. In an embodiment, the method comprises: sending from a terminal to a server having access to an image database, a visual search request comprising the descriptors of the characteristic points of the first image, the server performing the comparison of each descriptor received with the descriptors of the second image belonging to an image database, and the test of transformation models to determine the relevance of the second image; and sending information from the server to the terminal concerning an object appearing both in the first and in the second image if the latter is identified as relevant. In an embodiment, the method comprises: sending the ambiguity threshold from the server to the terminal; and using the ambiguity threshold received to determine non-ambiguous characteristic points in the first image, the descriptors of only the non-ambiguous characteristic points being sent in the visual search request by the terminal to the server. In an embodiment, the visual search request comprises the descriptors of the characteristic points of the first image, each associated with an ambiguity rating, the image database stores the descriptors of only the non-ambiguous characteristic points of the images in the image database, taking account of the ambiguity threshold, and the server compares the ambiguity threshold with the ambiguity ratings received in the visual search request to determine ambiguous characteristic points of the first image. In an embodiment, the visual search request comprises the ambiguity threshold and the descriptors of only the non-ambiguous characteristic points of the first image, taking account of the ambiguity threshold, and the server uses the ambiguity threshold received to determine ambiguous characteristic points in the second image. In an embodiment, the second image is one of a plurality of images of an image database, each characteristic point of each image in the image database is associated with an ambiguity rating, and the ambiguity rating is compared with the ambiguity threshold to determine whether the characteristic point is ambiguous.

In an embodiment, a device comprises: a memory; and processing circuitry, which, in operation, extracts characteristic points from a first image; generates, for each characteristic point of the first image, a plurality of components of a descriptor describing an image region around the characteristic point; compares the descriptors of the characteristic points of the first image; and classifies the characteristic points of the first image based on the comparing and an ambiguity threshold. In an embodiment, the processing circuitry, in operation, removes characteristic points classified as ambiguous from a set of characteristic points associated with the first image. In an embodiment, the processing circuitry, in operation, associates a first characteristic point of the first image with an ambiguity rating based on a proximity of the descriptor of the first characteristic point to a descriptor of another characteristic point of the first image considered to be a closest characteristic point to the first characteristic point.

In an embodiment, a system comprises: a memory; and processing circuitry, which, in operation: compares descriptors of characteristic points of a first image with descriptors of characteristic points of a second image, the characteristic points of at least one of the first and second images being limited to characteristic points classified as non-ambiguous based on an ambiguity threshold; identifies, based on the comparisons of the descriptors, a set of pairs of characteristic points belonging respectively to the first and second images, the descriptors of which have a proximity lower than a first threshold; defines a set of spatial transformation models linking the respective positions of the characteristic points of at least two pairs of the set of pairs; tests the spatial transformation models by determining whether a model links respective positions of the characteristic points of other pairs of characteristic points, within an error margin lower than a position error threshold; and identifies the second image as a relevant search image based on whether at least one of the transformation models links characteristic points of a number of pairs greater than a threshold of number of pairs. In an embodiment, the testing considers ambiguous characteristic points. In an embodiment, the second image is one of a plurality of images of an image database and the processing circuitry, in operation: compares the first image with a plurality of images of the image database; and associates a visual search relevance rating with images of the image database identified as relevant. In an embodiment, the visual search relevance rating of an image of the image database identified as relevant is based on the number of pairs of links established by the at least one transformation model. In an embodiment, the system comprises: a terminal, which, in operation, sends a visual search request comprising the descriptors of the characteristic points of the first image to the processing circuitry. In an embodiment, the processing circuitry, in operation, sends the ambiguity threshold to the terminal and the terminal, in operation, identifies non-ambiguous points in the first image to include in the visual search request based on the ambiguity threshold.

Some embodiments relate to a method for extracting characteristic points from an image, the method comprising steps of: extracting characteristic points from a first image, generating for each characteristic point a plurality of components of a descriptor describing an image region around the characteristic point, and comparing two by two the descriptors of the characteristic points of the first image, the characteristic points whose descriptors have a proximity between them higher than an ambiguity threshold, being considered ambiguous.

According to one embodiment, the ambiguous characteristic points are removed from a set of characteristic points associated with the first image.

According to one embodiment, each characteristic point of the first image is associated with an ambiguity rating determined according to the proximity of the descriptor of the characteristic point to another descriptor of a characteristic point of the first image considered to be the closest.

According to one embodiment, the method comprises for each characteristic point, determining a direction of the characteristic point, determining points of a region around the characteristic point, oriented according to the direction of the characteristic point, from the pixels of the image region around the characteristic point, dividing the oriented region into sub-regions, and determining for each sub-region a characteristic point descriptor component from the points of the sub-region.

Some embodiments also relate to a method for searching in an image for an object visually similar to an object appearing in another image, the method comprising: extracting characteristic points from a first image, by implementing the extraction method defined above, comparing each descriptor of a characteristic point of the first image with each descriptor of a characteristic point of a second image, to obtain a set of pairs of characteristic points belonging respectively to the first and second images and the descriptors of which have a proximity lower than a first threshold, the characteristic point descriptors only being compared with characteristic points of the first and/or of the second image considered non-ambiguous, defining spatial transformation models linking the respective positions of the characteristic points of at least two pairs, and testing each transformation model by determining whether or not it links the respective positions of the characteristic points of other pairs in the list of pairs of characteristic points, with an error margin lower than a position error threshold, one of the transformation models being selected if it links the characteristic points of a number of pairs greater than a threshold of number of pairs, the second image being considered relevant for the visual search if one of the transformation models is selected for the second image.

According to one embodiment, each transformation model is tested considering the ambiguous characteristic points.

According to one embodiment, the second image belongs to an image database, the method comprising steps of comparing the first image with each second image belonging to the image database, and of associating a visual search relevance rating with each second image considered relevant in the image database, according to the number of pairs linked by the selected transformation model.

According to one embodiment, the second image belongs to an image database, the method comprising steps of associating a visual search relevance rating with each second image considered relevant in the image database, according to the surface area of a region of the second image delimited by the characteristic points belonging to the pairs linked by the selected transformation model.

According to one embodiment, the relevance rating is completed for each second image considered relevant, considering the ambiguous characteristic points detected in the first and second images to search therein for pairs of characteristic points having a proximity of descriptors lower than the first threshold, the relevance rating being incremented every time the selected transformation model links the respective positions of the characteristic points of a pair of ambiguous characteristic points.

According to one embodiment, the method comprises steps of sending from a terminal to a server having access to an image database, a visual search request comprising the descriptors of the characteristic points of the first image, the server performing the comparison of each descriptor received with the descriptors of the second image belonging to the image database, and the test of transformation models to determine the relevance of the second image, and sending information from the server to the terminal concerning an object appearing both in the first and in the second image if the latter is considered to be relevant.

According to one embodiment, the method comprises steps of: sending the ambiguity threshold from the server to the terminal, and using the ambiguity threshold received to determine non-ambiguous characteristic points in the first image, the descriptors of only the non-ambiguous characteristic points being sent in the visual search request by the terminal to the server.

According to one embodiment, the visual search request comprises the descriptors of the characteristic points of the first image, each associated with an ambiguity rating, the image database stores the descriptors of only the non-ambiguous characteristic points of the images in the image database, taking account of the ambiguity threshold, the server comparing the ambiguity threshold with the ambiguity ratings received in the visual search request to determine the ambiguous characteristic points of the first image.

According to one embodiment, the visual search request comprises the ambiguity threshold and the descriptors of only the non-ambiguous characteristic points of the first image, taking account of the ambiguity threshold, the server using the ambiguity threshold received to determine the ambiguous characteristic points in the second images in the image database.

According to one embodiment, each characteristic point of each second image in the image database is associated with an ambiguity rating to be compared with the ambiguity threshold to determine whether or not the characteristic point is ambiguous.

Some embodiments also relate to a communication terminal, characterized in that it implements an embodiment of the extraction methods described herein.

Some embodiments also relate to a server implementing an embodiment of the search methods described herein.

BRIEF DESCRIPTION OF THE SEVERAL VIEWS OF THE DRAWINGS

Some examples of embodiments will be described below in relation with, but not limited to, the following figures, in which.

DETAILED DESCRIPTION

Figure 1:
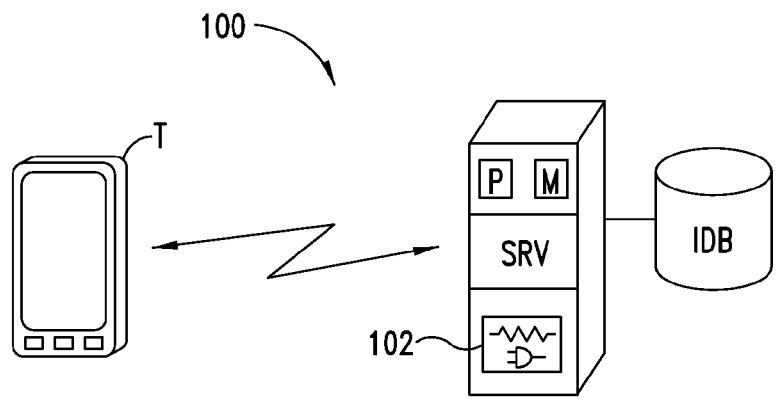
FIG. 1 schematically represents a system enabling a user to launch visual search requests.

FIG. 1 represents a system 100 comprising a server SRV integrating or connected to an image database IDB. The server SRV is configured to receive visual search requests for searching for user terminals T, such as a mobile telephone, and to supply in response a set of images corresponding to each request received, it being possible for each image to be associated with a relevance rating. Such a search aims to search in the images in the image database IDB for a visual object appearing in an image selected from the terminal T and thus to obtain images in the image database representing objects having a certain visual resemblance with an object appearing in the selected image. The terminal T can be equipped with an image sensor which can thus supply the image to be searched for in the image database. The server SRV, the terminal T and the image database IDB may comprise one or more processors, such as the illustrated processor P of server SRV, one or more memories, such as the illustrated memory M of the server SRV, discrete circuitry, such as the illustrated disrete circuitry 102 of server SRV, and various combinations thereof.

Figure 2:
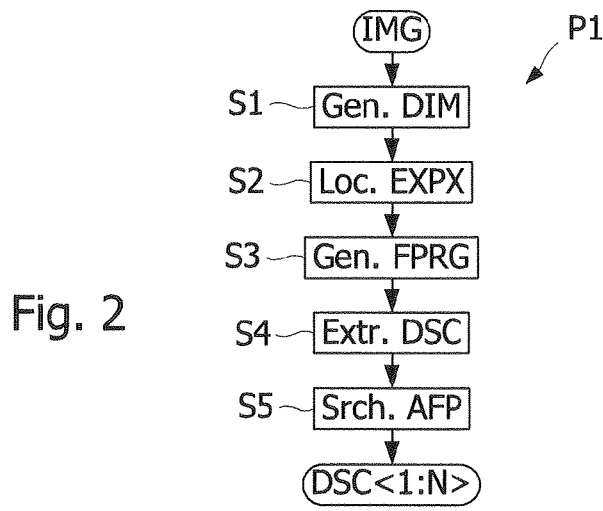
FIGS. 2 to 10 are flowcharts showing procedures executed during a visual search, according to various embodiments.

FIG. 2 represents steps S1 to S5 of a procedure P1, successively executed to generate a set of descriptors of characteristic points identified in an image in the image database IDB or in an image used to perform a visual search. These descriptors can have the form of vectors with several components. These descriptors are generated so as to be independent from the scale and the spatial configuration in a three-dimensional space of the objects appearing in the image based on which the request is made and in the images in the image database IDB. The procedure P1 can be executed by the server SRV and possibly by the terminal T. The procedure P1 receives at input an image IMG to be processed.

Step S1 comprises generating a series of ordered images, comprising the image IMG and images having increasingly coarse scales obtained from the image IMG. Step S2 comprises searching, in the series of images, for pixels where there are local extrema, e.g., pixels having a value greater or smaller than the pixels surrounding it. Here, the "pixel value" may be, for example, an intensity, a brightness, a color, or a level of gray, or even a depth if the image is an image of depth. If the image is in color, only the brightness or a fundamental color may be considered in some embodiment. This search for extrema may done both in each image of the series of images, and between the adjacent pixels in each group of three consecutive images of the series of images. The pixels corresponding to the extrema found are considered to be characteristic points of the image IMG. The characteristic points thus selected may be corners, T shapes or blobs.

Step S3 comprises defining a region around each selected pixel as a characteristic point of the image IMG. Defining a region around a characteristic point may comprise steps of calculating a pixel gradient vector for each pixel of the region, and a dominating extremum direction, determined from the gradient vectors of the region. The values of the pixels of a pixel matrix aligned with the dominating direction may be determined, so as to be independent from the direction of the characteristic point in the image. The pixel matrix thus obtained, forming the region of the characteristic point, may have a size of 16×16 pixels for example. An extremum descriptor can then be defined, containing the position of the characteristic point in one of the images of the series of images at different scales, an identifier of the image in which the characteristic point is found and the value of the direction of this point.

Step S4 comprises dividing each characteristic point region into sub-regions and generating a descriptor for each of these regions in each image of the series of images. The size of the regions and the number of sub-regions per region depends on the desired resolution. For example, each region may be divided into 16 sub-regions. Each characteristic point descriptor may comprise one or more components per sub-region, for example obtained from Haar wavelet coefficients applied to the points of the sub-region. Where dx are the coefficients of the wavelets applied horizontally, and dy the coefficients of the wavelets applied vertically to the points of a sub-region, the descriptor associated with this sub-region can be a four-component vector. The first of these four components is the sum of the dx coefficients, the second component is the sum of the dy coefficients, the third component is the sum of the absolute values of the dx coefficients, and the fourth component is the sum of the absolute values of the dy coefficients.

The descriptor thus obtained, which may be considered a visual signature of the characteristic point, is in the form of a multi-dimensional vector containing spatial information independent of the scale, relating to the region of the characteristic point. See, U.S. Pat. No. 6,711,293 issued to Lowe; D. G. Lowe, "Distinctive Image Features from Scale-Invariant Keypoints", International Journal of Computer Vision, 60, 2, pp. 91-110 (2004); US Publication No. 2009/0238460 by Funayama, et al.; and H. Bay, et al., "SURF: Speeded Up Robust Features", Computer Vision and Image Understanding (CVIU), Vol. 110, No. 3, pp. 346-259 (2008).

According to one embodiment, the procedure P1 comprises a step S5 executed after step S4 to detect ambiguous characteristic points. Such points may for example belong to repetitive patterns appearing in the image IMG. At the end of the step S4 of procedure P1, a set of descriptors DSC<1:N> has been generated for N characteristic points. Step S5 can reduce this set by eliminating any characteristic points detected as ambiguous. According to another embodiment, step S5 can specify the set DSC<1:N> by associating with each descriptor DSC an ambiguity indicator indicating whether or not the corresponding characteristic point is ambiguous, or an ambiguity rating which depends on the proximity of the descriptor DSC to the closest descriptor.

Figure 3:
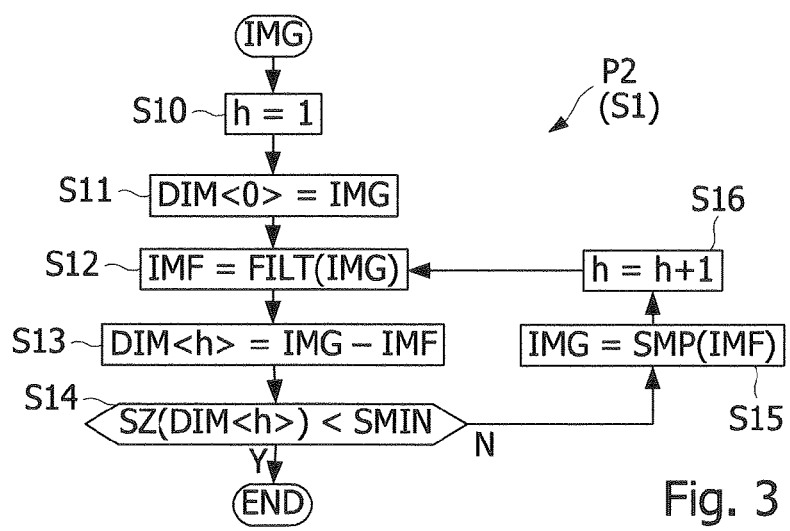

FIG. 3 represents steps S10 to S16 of an embodiment of a procedure P2 executed in step S1 of the procedure P1 to generate the series of images at different scales from the image IMG. Steps S10 to S16 are successively executed, steps S12 to S16 being then executed a certain number of times, for example until a criteria is satisfied. Step S10 comprises setting a variable h, for example to 0 or 1. Step S11 comprises loading the image IMG into the first image DIM<0> of the series of images DIM. In step S12, the image IMG is filtered to generate a filtered image IMF. The filter used may be a band-pass filter such as a Gaussian function, which is applied to the image in the two horizontal and vertical directions. In step S13, a difference image DIM<h> is calculated by subtracting the value of each pixel of the filtered image IMF from the value of each corresponding pixel of the image IMG. In step S14, the dimension or the size of the image DIM<h> is compared with a threshold dimension SMIN, for example 30×30 pixels. If the image DIM<h> did not reach the size SMIN, steps S15 and S16, then S12 to S14 are executed again, otherwise the procedure P2 ends. In step S15, the image to be processed IMG is replaced with the filtered image IMF that is undersampled to reduce its number of pixels. This undersampling may be carried out with a distance between the pixels equal to 1.5, for example, and each new sample may be assessed by a bilinear interpolation based on the four adjacent pixels. In step S16, the variable h is incremented by 1. Therefore, the variable h represents the scale level being processed. It shall be noted that to detect small objects in the image, the image IMG may be previously oversampled by performing a bilinear interpolation of pixels.

Figure 4:
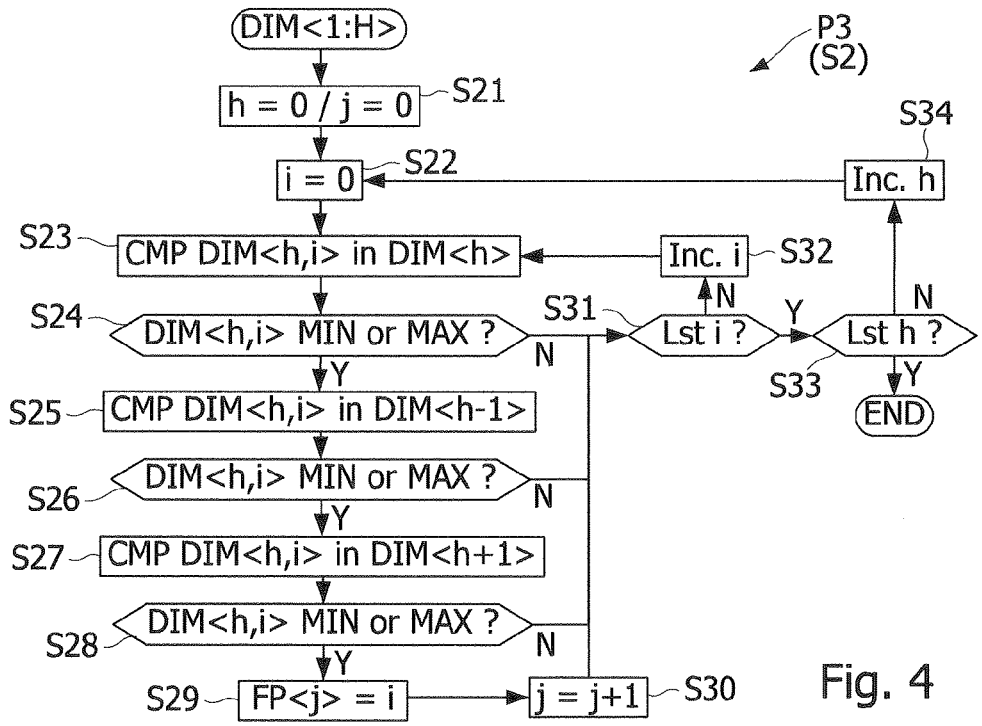

FIG. 4 represents steps S21 to S34 of an embodiment of a procedure P3 executed in step S2 of the procedure P1 to search for the pixels constituting local extrema (local minimum or maximum). Steps S21 to S24 are successively executed. In step S21, an image index h and a characteristic point index j are set to 0. In step S22, a pixel index i is set to 0. Steps S23 and S24 are then executed. In step S23, the value of the pixel DIM<h,i> is compared with the values of its (for example eight) neighboring pixels in the image DIM<h>. If the pixel DIM<h,i> is an extremum (step S24), steps S25 and S26 are executed, otherwise step S31 is executed. In step S25, the value of the pixel DIM<h,i> is compared with the values of its (for example nine) neighboring pixels in the image DIM<h−1>. If the pixel DIM<h,i> is an extremum (step S26), steps S27 and S28 are executed, otherwise step S31 is executed. In step S27, the value of the pixel DIM<h,i> is compared with the values of its (for example nine) neighboring pixels in the image DIM<h+1>. If the pixel DIM<h,i> is an extremum (step S28), steps S29 to S31 are executed, otherwise step S31 is executed directly. In step S29, the pixel DIM<h,i> is stored as characteristic point FP<j>. In step S30, the characteristic point index j is incremented by 1. In step S31, the pixel index i is tested to determine whether or not it references the last pixel of the image DIM<h>. If the index i does not reference the last pixel of the image DIM<h>, steps S32, S23 and S24 are executed, otherwise step S33 is executed. In step S32, the index i is incremented. In step S33, the image index h is tested to determine whether it references the last image of the series DIM. If the index h does not reference the last image, steps S34 and S22 to S24 are executed, otherwise the procedure P3 ends. In step S34, the index h is incremented.

The extremum may also be searched for in steps S23 to S28 by calculating for each pixel the determinant of the Hessian matrix, or a value close to this determinant, and by determining whether the value obtained for this determinant is an extreme value in the volume around the pixel formed by the adjacent pixels of the pixel in the image DIM<h> and in the adjacent images DIM<h+1> and DIM<h−1>.

Figure 5:
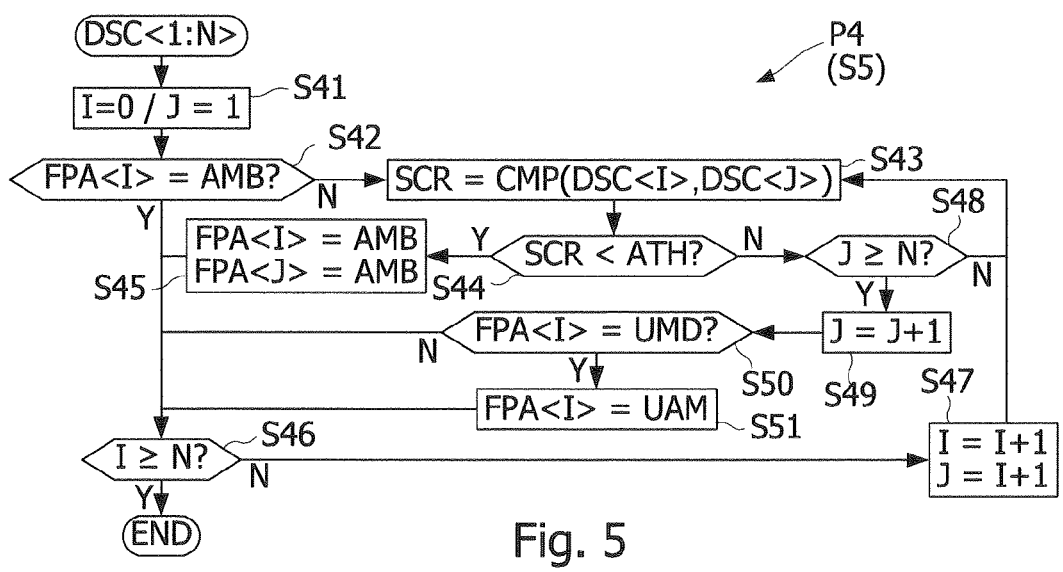

FIG. 5 represents steps S41 to S51 of an embodiment of a procedure P4 executed in step S5 to determine whether or not there are any ambiguous characteristic points, e.g., similar to another characteristic point. The procedure P4 receives the list DSC(1:N) of the descriptors of all the characteristic points found in the image IMG (in the series of images DIM). Steps S41 and S42 are successively executed. In step S41, indices I and J are set to 0 and 1. In step S42, it is determined whether or not the characteristic point FP<I> has already been marked as ambiguous (FPA<I>=AMB). If this is the case, steps S46 and S47 are executed, otherwise steps S43 and S44 are executed. In step S43, the descriptor DSC<I> of the point FP<I> is compared with the descriptor DSC<J> of another characteristic point and a comparison rating SCR is determined. In step S44, the comparison rating SCR is compared with an ambiguity threshold ATH. If the rating SCR is greater than the threshold ATH, revealing that the characteristic points may be considered ambiguous, steps S45 to S47 are executed, otherwise steps S48 and S49 are executed. In step S45, the two characteristic points FP<I> and FP<J> are marked as ambiguous (FPA<i> and FPA<j> set to AMB). In step S46, the index I is tested to determine whether or not it references the last point FP<N>. If this is the case, the procedure P4 ends, otherwise steps S47, S43 and S44 are executed. In step S47, the index I is incremented by 1 and the index J is set to the value of the index I+1 to test other characteristic points. In step S48, the index J is tested to determine whether or not it references the last point FP<N>. If this is the case, steps S43 and S44 are executed, otherwise steps S49 and S50 are executed. In step S49, the index J is incremented by 1. In step S50, it is determined whether or not the point FP<I> is marked as untested (FPA<I>=UMD). If this is the case, steps S51, S46 and S47 are executed, otherwise steps S46 and S47 are executed. Step S51 is thus executed if the point FP<I> was compared with all the other non-ambiguous points of the image IMG without being marked as ambiguous. It is thus marked as non-ambiguous (FPA<I>=UAM).

Figure 6:
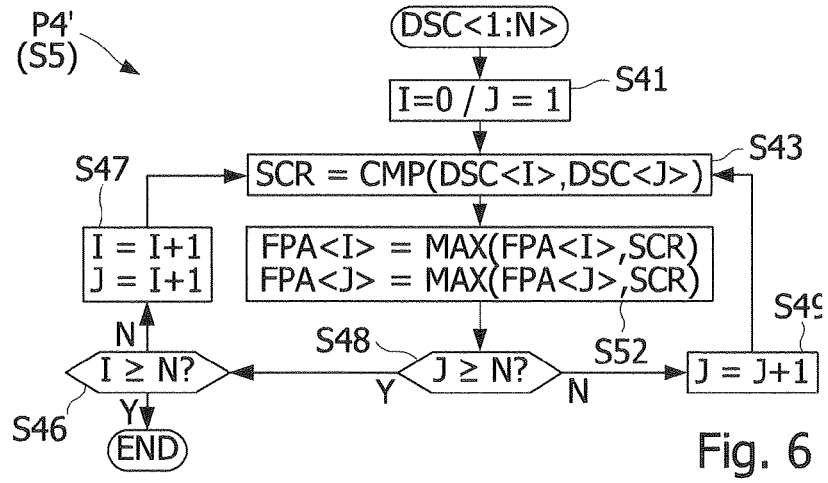

According to another embodiment shown in FIG. 6, the maximum ratings SCR obtained in step S43 for each characteristic point FP<I> are stored in association with the latter. Thus, FIG. 6 represents a procedure P4' comprising steps S41, S43, S46 to S49 and a new step S52. Step S43 is executed directly further to step S41. Step S52, that is executed further to step S43, updates the ambiguity rating saved for each of the characteristic points FP<I> and FP<J> with the rating SRC obtained in step S41 if the latter is higher than the rating previously saved for this point. Step S48 is executed further to step S52. In step S48, if the index J references the last point FP<N>, step S46 is executed, otherwise steps S49, S43, S52 and S48 are executed. In step S46, the index I is tested to determine whether or not it references the last point FP<N>. If this is the case, the procedure P4' ends, otherwise steps S47, S43, S52 and S48 are executed.

Figure 7:
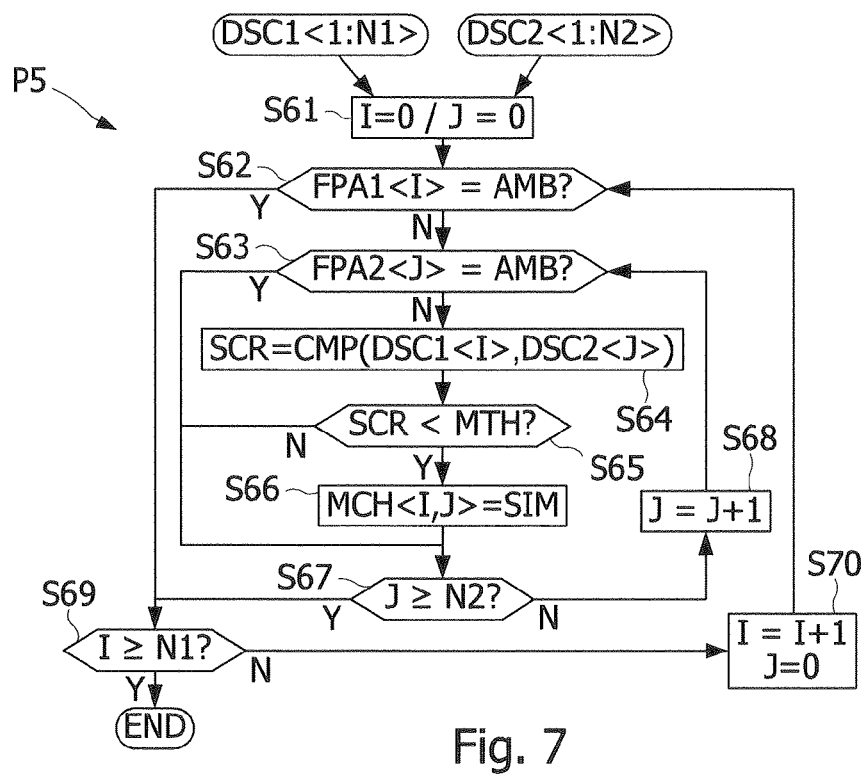

FIG. 7 represents steps S61 to S70 of an embodiment of a procedure P5 executed to compare the descriptors DSC1 and DSC2 extracted from two images, in order to determine whether an object appearing in a first image is also in a second image. The procedure P5 enables pairs of points to be identified each containing a characteristic point of the first image and a characteristic point of the second image, detected as similar.

Steps S61 and S62 are successively executed. In step S61, indices I and J are set to 0. Then, steps S64 and S65 are executed only if the characteristic points corresponding to the indices I and J have not been considered ambiguous when executing the procedure P4 (FIG. 5) on each of the two images. If, in step S62, the point at the index I in the first image is ambiguous (FPA1<I>=AMB), steps S69 and S70 are executed. If, in step S63, the point at the index J in the second image is ambiguous (FPA2<J>=AMB), steps S67 and S68 are executed. If the procedure P4' was executed, steps S62 and S63 may comprise a comparison of the ratings FPA<i> and FPA<j> with a threshold value. In step S64, the descriptor DSC1<I> of the point of index I in the first image is compared with the descriptor DSC2<J> of the point of index J in the second image. This comparison, like the one performed in step S43, may comprise the calculation of the sum of the squares of the differences of the corresponding components of the two descriptors considered multi-dimensional vectors, which amounts to calculating a distance between two vectors. The algorithm of the k-d tree may also be implemented for this purpose.

The result of this comparison is represented by a rating SCR. In step S65, the rating SCR obtained is compared with a threshold value MTH. If the rating obtained indicates a sufficiently high match between the two descriptors DSC1<I> and DSC2<J>, the points thus compared are considered similar and steps S66 and S67 are executed, otherwise step S67 is executed. If a descriptor DSC1<I> is determined sufficiently close to several descriptors DSC2<j>, a single pair <I,J> corresponding to the best rating SCR can be chosen.

In step S66, the pairs <I,J> chosen are stored, for example in a two-dimensional table MCH, one for indices I and the other for indices J. In step S67, if the index J references the last point N2 of the second image, the execution of the procedure P5 continues from step S69, otherwise it continues at step S68, then at step S63. In step S68, the index J is incremented by 1 to reference the next characteristic point of the second image. In step S69, if the index I references the last point N1 of the first image, the execution of the procedure P5 continues at step S70, then at step S62, otherwise it is finished. In step S70, the index I is incremented to reference the next characteristic point of the first image, and the index J is reset.

Figure 8:
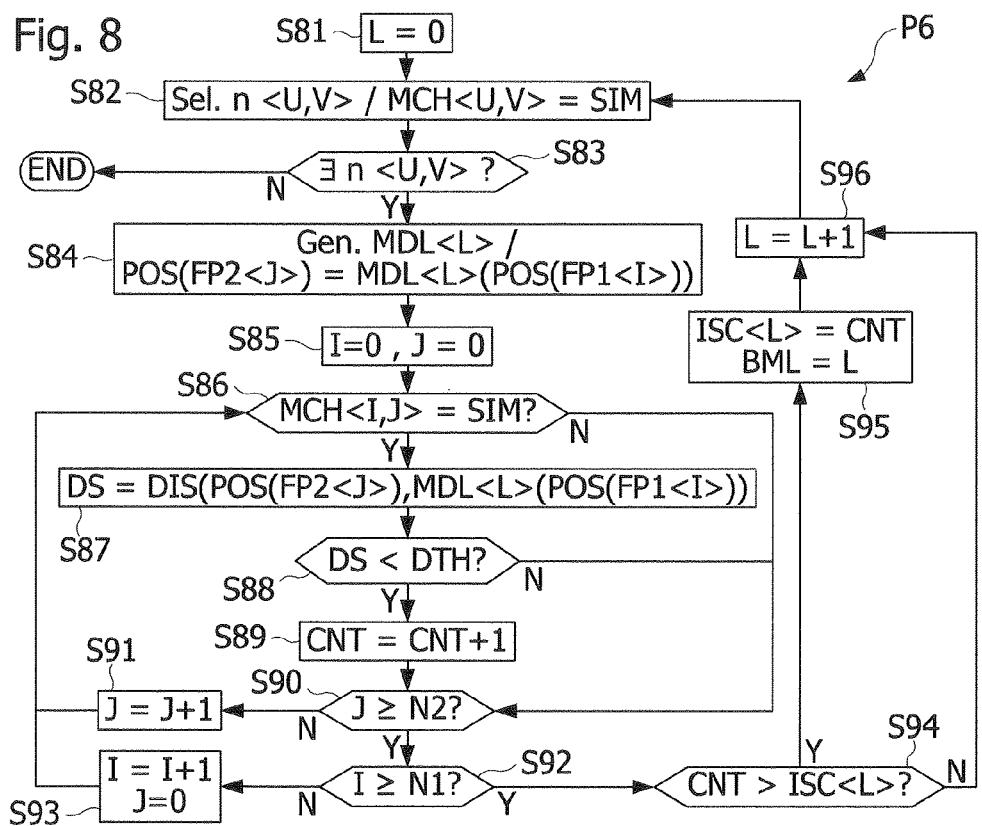

FIG. 8 represents steps S81 to S96 of an embodiment of a procedure P6 implementing the RANSAC algorithm to determine a homographic transformation model matching the respective positions in the first and the second image of a maximum number of characteristic points detected as similar between the two images. Such a transformation may be used to model displacement of a plane object in a three-dimensional space, projected in a two-dimensional space, taking into account a perspective effect.

Steps S81 to S83 are successively executed. In step S81, an index of similar characteristic points in the first and the second image is set. In step S82, a group of a certain number n of pairs of similar characteristic points in the two images is selected. To generate a homographic transformation model, the number n of pairs of selected similar points may, for example, be chosen equal to 4. In step S83, if such a group can be selected, steps S84 to S86 are executed, otherwise, this means that all the possible groups of pairs of points have been tested and the procedure P6 ends. In step S84, a homographic transformation model MDL<L> is generated. Such a model may be, for example, represented by a 3×3 matrix, thus defined by 9 coefficients, 8 coefficients of which are independent. These 9 coefficients may be determined by solving an equation system with 8 unknown quantities obtained from the known positions of the pairs of points of the group selected in step S82, in the first and the second image.

Steps S85 to S93 determine the number CNT<L> of pairs of points corresponding to the model MDL<L> generated in step S84. In step S85, indices I and J are reset. In step S86, it is determined whether the characteristic point of index I in the first image is similar to the point of index J in the second image (MCH<i,j>=SIM). If these two points are similar, steps S87 to S91 are executed, otherwise step S90 is executed. In step S87, the distance DS between the point FP2<J> and the point FP1<i> transformed by the model MDL<L>, in the second image, is calculated. In step S88, the distance DS is compared with a distance threshold value DTH. If the two points compared in step S87 are sufficiently close (distance DS lower than the threshold DTH), steps S89 and S90 are executed. In step S89, the counter CNT is incremented by 1. In step S90, if the index J does not reference the last characteristic point of the second image, the execution of the procedure P6 continues at step S91, then S86, otherwise step S92 is executed.

In step S91, the index J is incremented by 1. In step S92, if the index I does not reference the last characteristic point of the first image, the execution of the procedure P6 continues at step S93 then at step S86, otherwise steps S94 to S96, S82 and S83 are executed. In step S93, the index I is incremented by 1 and the index J is reset. In step S94, the counter CNT is compared with an image relevance rating ISC<L> of the model MDL<L>. If the counter CNT is higher than the rating ISC<L>, steps S95 and S96 are executed, otherwise step S96 is executed directly. In step S95, the rating ISC<L> takes the value of the counter CNT and a variable BML referencing the best model MDL<L> receives the value of the index L. In step S96, the counter L is incremented by 1. The execution of the procedure P6 continues from step S82 to consider another group of pairs of similar points and generate, then test a new homographic transformation model.

At the end of the execution of the procedure P6, the best homographic transformation model MDL<BML> found and the rating SCR<BML> of this model are available.

Other types of transformation models can of course be considered. For example, a translational-type model enables the difference in position of characteristic points detected as similar between the two images to be modeled through a displacement in the 2D plane. To define such a displacement, only two parameters are necessary. A single pair of similar characteristic points may be used to determine these two parameters. This type of model enables an object to be represented in apparent motion parallel to the plane of the sensor of the video cameras, with the same sensors and focal distances. However, this translational model may be insufficient for cases when the objects do not move at the same distance from the video camera, or when the video cameras are not substantially identical.

Embodiments of affine transformation-type models may estimate six parameters, from three pairs of similar characteristic points. This type of model enables the motion of an object to be represented, in translation compared to the video cameras, not necessarily parallel to the plane of the sensors, and in rotation about an axis perpendicular to the sensor of the video cameras. The video cameras may have different sizes of sensor and focal distance. However, the affine model type seems less general than the homographic model, which facilitates 3D transformation of a plane object to be represented, whatever the size of the sensors and the focal distances of each of the video cameras.

According to one embodiment, any characteristic points that have been considered ambiguous in the two images may be used to find the best transformation model. For this purpose, steps S85 to S94 can be executed on these points, step S86 being optional. Indeed, as they are ambiguous points, it is not necessary to test their similarities with other points. It is sufficient to determine whether or not the transform through the model MDL<L> of each ambiguous point in the first image corresponds in the second image to a characteristic point having a descriptor close to the ambiguous point, given the distance threshold DTH. Therefore, the rating ISC<L> obtained in steps S89 and S95 also takes the ambiguous points into account.

According to one embodiment, any characteristic points that have been considered ambiguous in the two images, may be tested to determine whether or not there is any match between them through the best transformation model MDL<BML>, so as to complete the rating SCR of the second image IMG2. For this purpose, for each ambiguous point of the first image, it can be determined whether there is an ambiguous point having a close descriptor, in the second image close to (as determined by the distance threshold DTH) the transform of the position of a characteristic point of the first image.

Figure 9:
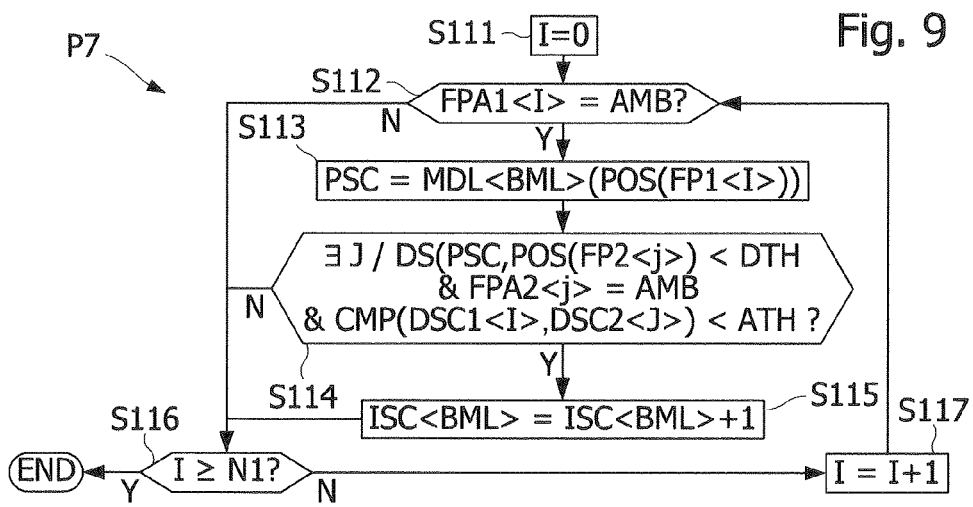

Therefore, FIG. 9 represents steps S111 to S117 of an embodiment of a procedure P7 which may be executed further to the procedure P6, when the image IMG2 has a sufficient rating ISC<BML>. Steps S111 and S112 are successively executed. In step S111, an index I is set to 0. In step S112, if the characteristic point of index I of the first image was considered ambiguous (in step S45), steps S113 and S114 are executed, otherwise the execution of the procedure P7 continues at step S116. In step S113, the position PSC of the point in the second image IMG2 obtained by the transformation model MDL<BML> applied to the position of the characteristic point FP1<I> is calculated. In step S114, it is determined whether there is an index J corresponding to a possibly ambiguous point of the image IMG2 (FPA<J>=AMB) such that the distance between the point PSC calculated in step S113 and the position of the point FP2<J> is lower than the distance threshold DTH and such that the descriptors DSC1<I> and DSC2<J> of the points FP<i> and FP<J> are sufficiently close (distance between the descriptors lower than the threshold ATH). If such an index J is found, steps S115 and S116 are executed, otherwise the execution of the procedure P7 continues at step S116. In step S115, the rating SCR<BML> of the image IMG2 is incremented by 1. In step S116, if the index I does not reference the last characteristic point of the first image IMG1, the execution of the procedure P7 continues at step S117, then at step S112, otherwise the execution of the procedure P7 ends. In step S117, the index I is incremented by 1 to reference another characteristic point of the image IMG1.

Thus, the procedure P7 refines the determination of the relevance rating between the two images IMG1 and IMG2, without rendering the processing and in particular the search for a relevant homographic transformation model more complex. It shall be noted that the processing for refining the rating of the images IMG2 may have a limited impact on the total duration of the visual search processing, as it may be executed only on the images IMG2 already considered relevant in relation to the image IMG 1. It shall further be noted that the procedure P7 may be applied only to the points considered ambiguous (step S112) and thus only relates to a limited number of characteristic points of the image IMG1.

Figure 10:
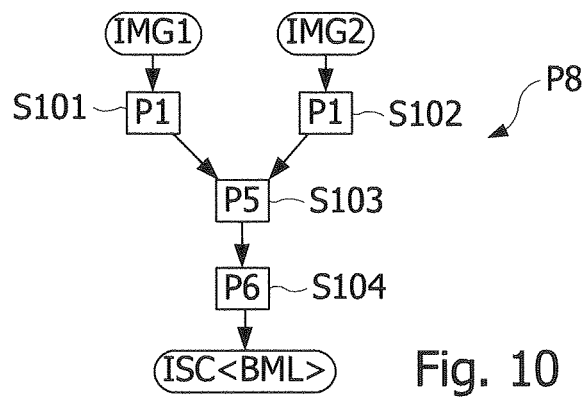

FIG. 10 represents steps S101 to S104 of an embodiment of a procedure P8 executed to determine whether or not an object appearing in an image IMG1, is in an image IMG2. In steps S101 and S102, the procedure P1 is applied to the images IMG1 and IMG2 to obtain descriptors of characteristic points of these two images. In step S103, the procedure P5 is applied to the descriptors obtained in steps S101 and S102 to search for pairs of characteristic points having close descriptors in the two images. In step S104, the procedure P6 is then executed to obtain a comparison rating ISC<BML> of the two images IMG1, IMG2.

To perform a visual search in the image database IDB, the procedure P8 is executed several times from the image IMG1 with as a second image IMG2 all or part of the images in the base IDB. Step S102 can be executed once and for all on each of the images in the database IDB, the descriptors obtained DSC2 being stored in the image database IDB in order to perform other visual searches therein. Similarly, step S101 is executed once on the image IMG1, to obtain descriptors of characteristic points that are then used to execute steps S103 and S104 with the descriptors of characteristic points of each image IMG2.

According to one embodiment, the procedure P8 is entirely executed by the server SRV from an image IMG1 that was sent to it in a visual search request.

According to another embodiment, step S101 is executed by the terminal T which then sends the server SRV the descriptors DSC1 it has extracted from the image IMG1 in a visual search request.

Once the procedure P8 executed with at least a portion of the images IMG2 in the image database IDB, the server SRV may supply the terminal T with one or more images IMG2 with which the best ratings have been obtained. The server SRV may also or instead supply information concerning an object appearing both in the image IMG2 and in the image(s) IMG2 having obtained the best rating(s) ISC<BML>. Therefore, the procedure P8 may be executed with the images IMG2 in the image database IDB until an image IMG2 having a sufficient rating SC<BML> (for example greater than a certain threshold) is found.

It is possible for the descriptors of the ambiguous points not to be stored in the base IDB. In this case, the server SRV sends the terminal T the ambiguity threshold ATH used to generate the descriptors of the base IDB. The terminal T processes the image IMG1 by executing the procedure P4 with the threshold ATH received. The terminal T may then send the server SRV only the descriptors DSC1 of the non-ambiguous points of the image IMG1.

If the descriptors of the ambiguous points are stored in the database IDB, the terminal T may also send the descriptors of the points marked as ambiguous, for example in order to enable the server SRV to execute the procedure P7.

According to one embodiment, the terminal T sends the server SRV the ambiguity threshold ATH it used to reject ambiguous characteristic points. Furthermore, the procedure P4' was executed on the images in the database IDB to associate an ambiguity rating FPA with each of the descriptors stored in the image database IDB. Upon receiving a visual search request including the threshold ATH, the server SRV may reject the descriptors associated with an ambiguity rating FPA lower than the threshold ATH received, during the descriptor comparisons (procedure P5).

It will be understood by those skilled in the art that embodiments of the present disclosure are susceptible of various alternative embodiments and various applications. In particular, the disclosure is not limited to the application of one or other of the SIFT and SURF algorithms, and may, for example, apply to any algorithm for detecting and/or describing characteristic points, such as FAST (see, Rosten, et al., "Machine Learning for High-Speed Corner Detection", Computer Vision-ECCV 2006. Springer Berlin Heidelberg, 430-443 (2006), BRIEF (see, Calonder, et al., "BRIEF: Binary Robust Independent Elementary Features", Computer Vision-ECCV 2010. Springer Berlin Heidelberg, 778-792 (2010), ORB (see, Rublee, et. al., "ORB: an efficient alternative to SIFT or SURF", Computer Vision (ICCV), 2011 IEEE International Conference on. IEEE, (2011), BRISK (see, Leutenegger, et al., "BRISK: Binary robust invariant scalable keypoints", Computer Vision (ICCV), 2011 IEEE International Conference on. IEEE (2011), or FREAK (see, Alahi, et al., "FREAK: Fast Retina Keypoint", Computer Vision and Pattern Recognition (CVPR), 2012 IEEE Conference on. IEEE (2012), where descriptors of characteristic points may be extracted from an image. In particular, the determination of a descriptor for each characteristic point may be carried out otherwise than by determining a direction of the characteristic point, by determining a region whose direction is in line with the direction of the characteristic point, and by determining one component per sub-region of the oriented region. This is particularly the case of the BRIEF descriptor, which describes a region with no change of direction, merely by selecting a set of pairs of points in the region following a fixed pattern, by calculating the sign of the intensity differences between points of each pair, and by encoding a 1 in a bit string if the difference is positive, otherwise 0. The bit string obtained is a descriptor, and a distance measurement applicable between two descriptors is a Hamming distance.

Furthermore, it is not necessary for the ambiguous characteristic points of the first image IMG1 and of the second images IMG2 belonging to the image database IDB to be determined with a same ambiguity threshold.

Embodiments of the present disclosure may apply to fields other than the visual search for an object represented in an image among a set of images. Embodiments may be applied to other applications using matching of characteristic points extracted from images, such as for example an application extracting a field of motion vectors between two images temporally consecutive within a video sequence, each motion vector extracted corresponding to a match between characteristic points between the two images.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems, devices and/or modules and/or circuits and/or blocks may be implemented or provided in other manners, such as at least partially in circuitry such as firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   extracting characteristic points from a first image;
   generating for each characteristic point of the first image a plurality of components of a descriptor describing an image region around the characteristic point;
   comparing the descriptors of the characteristic points of the first image;
   classifying characteristic points of the first image based on the comparing and an ambiguity threshold;
   comparing descriptors of characteristic points of the first image with descriptors of characteristic points of a second image, to obtain a set of pairs of characteristic points belonging respectively to the first and second images, the descriptors of which have a proximity lower than a first threshold;
   defining a set of spatial transformation models linking the respective positions of the characteristic points of at least two pairs;
   testing the spatial transformation models by determining whether a model links respective positions of the characteristic points of other pairs of characteristic points, within an error margin lower than a position error threshold; and
   identifying the second image as a relevant visual search image based on whether at least one of the transformation models links characteristic points of a number of pairs greater than a threshold of number of pairs, wherein the comparing descriptors of characteristic points of the first image to descriptors of characteristic points of the second image is limited to characteristic points classified as non-ambiguous with respect to at least one of the first and second images and the testing considers ambiguous characteristic points.

2. The method according to claim 1, comprising:
   removing characteristic points classified as ambiguous from a set of characteristic points associated with the first image.

3. The method according to claim 1, comprising:
   associating a first characteristic point of the first image with an ambiguity rating based on a proximity of the descriptor of the first characteristic point to a descriptor of another characteristic point of the first image considered to be a closest characteristic point to the first characteristic point.

4. The method according to claim 1, comprising, for each characteristic point:
   determining a direction of the characteristic point;
   determining points of a region around the characteristic point, oriented according to the direction of the characteristic point, from pixels of the region around the characteristic point;
   dividing the region into sub-regions; and
   determining for each sub-region a characteristic point descriptor component from the points of the sub-region.

5. A method, comprising:
   extracting characteristic points from a first image;
   generating for each characteristic point of the first image a plurality of components of a descriptor describing an image region around the characteristic point;
   comparing the descriptors of the characteristic points of the first image;
   classifying characteristic points of the first image based on the comparing and an ambiguity threshold;
   comparing descriptors of characteristic points of the first image with descriptors of characteristic points of a second image, to obtain a set of pairs of characteristic points belonging respectively to the first and second images, the descriptors of which have a proximity lower than a first threshold;
   defining a set of spatial transformation models linking the respective positions of the characteristic points of at least two pairs;
   testing the spatial transformation models by determining whether a model links respective positions of the characteristic points of other pairs of characteristic points, within an error margin lower than a position error threshold; and identifying the second image as a relevant visual search image based on whether at least one of the transformation models links characteristic points of a number of pairs greater than a threshold number of pairs, wherein the second image is one of a plurality of images of an image database and the method comprises:

comparing the first image with the plurality of images of the image database; and associating a visual search relevance rating with an image of the image database identified as relevant based on a surface area of a region of the image of the database delimited by the characteristic points belonging to the pairs linked by the at least one transformation model.

6. The method of claim 5 wherein the comparing descriptors of characteristic points of the first image to descriptors of characteristic points of the second image is limited to characteristic points classified as non-ambiguous with respect to at least one of the first and second images.

7. The method according to claim 6 wherein the testing considers ambiguous characteristic points.

8. The method according to claim 5, comprising:
removing characteristic points classified as ambiguous from a set of characteristic points associated with the first image.

9. The method according to claim 5, comprising:
associating a first characteristic point of the first image with an ambiguity rating based on a proximity of the descriptor of the first characteristic point to a descriptor of another characteristic point of the first image considered to be a closest characteristic point to the first characteristic point.

10. The method according to claim 5, comprising, for each characteristic point:
determining a direction of the characteristic point;
determining points of a region around the characteristic point, oriented according to the direction of the characteristic point, from pixels of the region around the characteristic point;
dividing the region into sub-regions; and
determining for each sub-region a characteristic point descriptor component from the points of the sub-region.

11. A method, comprising:
extracting characteristic points from a first image;
generating for each characteristic point of the first image a plurality of components of a descriptor describing an image region around the characteristic point;
comparing the descriptors of the characteristic points of the first image;
classifying characteristic points of the first image based on the comparing and an ambiguity threshold;
comparing descriptors of characteristic points of the first image with descriptors of characteristic points of a second image, to obtain a set of pairs of characteristic points belonging respectively to the first and second images, the descriptors of which have a proximity lower than a first threshold;
defining a set of spatial transformation models linking the respective positions of the characteristic points of at least two pairs;
testing the spatial transformation models by determining whether a model links respective positions of the characteristic points of other pairs of characteristic points, within an error margin lower than a position error threshold; and identifying the second image as a relevant visual search image based on whether at least one of the transformation models links characteristic points of a number of pairs greater than a threshold number of pairs, wherein the second image is one of a plurality of images of an image database;

comparing the first image with the plurality of images of the image database; and associating a visual search relevance rating with an image of the image database identified as relevant based on a number of pairs linked by the at least one transformation model, wherein the relevance rating is completed for each image of the image database identified as relevant, ambiguous characteristic points in the first and second images are searched for pairs of characteristic points having a proximity of descriptors lower than the first threshold, and the relevance rating is incremented when the at least one transformation model links respective positions of the characteristic points of a pair of ambiguous characteristic points.

12. The method according to claim 11, comprising:
associating a visual search relevance rating with an image of the image database identified as relevant based on a surface area of a region of the image of the image database delimited by the characteristic points belonging to the pairs linked by the at least one transformation model.

13. The method according to claim 11, comprising:
removing characteristic points classified as ambiguous from a set of characteristic points associated with the first image.

14. The method according to claim 11, comprising:
associating a first characteristic point of the first image with an ambiguity rating based on a proximity of the descriptor of the first characteristic point to a descriptor of another characteristic point of the first image considered to be a closest characteristic point to the first characteristic point.

15. The method according to claim 11, comprising, for each characteristic point:
determining a direction of the characteristic point;
determining points of a region around the characteristic point, oriented according to the direction of the characteristic point, from pixels of the region around the characteristic point;
dividing the region into sub-regions; and
determining for each sub-region a characteristic point descriptor component from the points of the sub-region.

16. The method of claim 11 wherein the comparing descriptors of characteristic points of the first image to descriptors of characteristic points of the second image is limited to characteristic points classified as non-ambiguous with respect to at least one of the first and second images.

17. The method according to claim 16 wherein the testing considers ambiguous characteristic points.

18. A system, comprising:
a memory; and
processing circuitry, which, in operation:
compares descriptors of characteristic points of a first image with descriptors of characteristic points of a second image, the characteristic points of at least one of the first and second images being limited to characteristic points classified as non-ambiguous based on an ambiguity threshold;
identifies, based on the comparisons of the descriptors, a set of pairs of characteristic points belonging respectively to the first and second images, the descriptors of which have a proximity lower than a first threshold;

defines a set of spatial transformation models linking the respective positions of the characteristic points of at least two pairs of the set of pairs;

tests the spatial transformation models by determining whether a model links respective positions of the characteristic points of other pairs of characteristic points, within an error margin lower than a position error threshold, wherein the testing considers ambiguous characteristic points; and identifies the second image as a relevant search image based on whether at least one of the transformation models links characteristic points of a number of pairs greater than a threshold of number of pairs.

19. The system of claim 18 wherein the second image is one of a plurality of images of an image database and the processing circuitry, in operation:

compares the first image with a plurality of images of the image database; and associates a visual search relevance rating with images of the image database identified as relevant.

20. The system of claim 19 wherein the visual search relevance rating of an image of the image database identified as relevant is based on the number of pairs of links established by the at least one transformation model.

21. A method, comprising:

comparing, using digital image processing circuitry, descriptors of characteristic points of a first image with descriptors of characteristic points of a second image, the characteristic points of at least one of the first and second images being limited to characteristic points classified as non-ambiguous based on an ambiguity threshold;

identifying, using the digital image processing circuitry and based on the comparisons of the descriptors, a set of pairs of characteristic points belonging respectively to the first and second images, the descriptors of which have a proximity lower than a first threshold;

defining, using the digital image processing circuitry, a set of spatial transformation models linking the respective positions of the characteristic points of at least two pairs of the set of pairs;

testing, using the digital image processing circuitry, the spatial transformation models by determining whether a model links respective positions of the characteristic points of other pairs of characteristic points, within an error margin lower than a position error threshold, wherein the testing considers ambiguous characteristic points; and identifying, using the digital image processing circuitry, the second image as a relevant search image based on whether at least one of the transformation models links characteristic points of a number of pairs greater than a threshold of number of pairs.

22. The method of claim 21 wherein the second image is one of a plurality of images of an image database and the method comprises:

comparing the first image with a plurality of images of the image database; and associating a visual search relevance rating with images of the image database identified as relevant.

23. The method of claim 22 wherein the visual search relevance rating of an image of the image database identified as relevant is based on the number of pairs of links established by the at least one transformation model.

* * * * *